US005456934A

United States Patent [19]
Lee et al.

[11] Patent Number: 5,456,934
[45] Date of Patent: Oct. 10, 1995

[54] PROCESS FOR PREPARING RETORT-STABLE, SHAPED FOOD PIECES

[76] Inventors: Patrick S. Lee, 26 E. Cunningham Dr., Palatine, Ill. 60067; Camile A. Louis, 2310 W. Nichols Rd. Apt. F, Arlington Heights, Ill. 60004

[21] Appl. No.: 168,016

[22] Filed: Dec. 15, 1993

[51] Int. Cl.⁶ ................................................. A21D 10/00
[52] U.S. Cl. .......................... 426/549; 426/74; 426/516; 426/623; 426/635; 426/805
[58] Field of Search ................................ 426/2, 549, 805, 426/74, 623, 635, 516

[56] References Cited

U.S. PATENT DOCUMENTS

| | | | |
|---|---|---|---|
| 3,900,573 | 8/1975 | Freck et al. | 426/274 |
| 3,959,511 | 5/1976 | Balanz et al. | 426/549 |
| 3,965,268 | 6/1976 | Stocker et al. | 426/331 |
| 3,968,268 | 7/1976 | Sair et al. | 426/580 |
| 4,029,823 | 6/1977 | Bone et al. | 426/249 |
| 4,039,691 | 8/1977 | Hildebolt | 426/511 |
| 4,128,051 | 12/1978 | Hildebolt | 99/348 |
| 4,211,797 | 7/1980 | Cante et al. | 426/2 |
| 4,235,935 | 11/1980 | Bone et al. | 426/249 |
| 4,238,515 | 12/1980 | Shemer | 426/104 |
| 4,310,558 | 1/1982 | Nahm, Jr. | 426/805 |
| 4,418,086 | 11/1983 | Marino et al. | 426/302 |
| 4,495,205 | 1/1985 | Brander et al. | 426/104 |
| 4,743,458 | 5/1988 | Gellman et al. | 426/805 |
| 4,990,356 | 2/1991 | Hamilton et al. | 426/805 |
| 4,997,671 | 3/1991 | Spanier | 426/805 |
| 5,000,943 | 3/1991 | Scaelione et al. | 426/805 |
| 5,000,973 | 3/1991 | Slaglione et al. | 426/805 |
| 5,141,755 | 8/1992 | Weisman | 426/42 |

FOREIGN PATENT DOCUMENTS

| | | |
|---|---|---|
| 63-84454 | 4/1988 | Japan. |
| 1171439 | 7/1989 | Japan. |

OTHER PUBLICATIONS

"Wheat; Processing and Food Uses": *The Crop*; pp. 4880–4881.

*Primary Examiner*—Jeanette Hunter
*Assistant Examiner*—Lien Tran

[57] ABSTRACT

A process for preparing a cohesive, retort-stable, shaped food piece. The process comprises: (a) preparing a premixture comprising, by weight, (1) from about 20% to about 80% by weight gluten, (2) from about 20% to about 80% by weight flour, (3) from 0% to about 50% by weight meat and bone meal, (4) from 0% to about 9% by weight fat, (5) from 0% to about 0.7% by weight added sulfur, and (6) from 0% to about 2% by weight dicalcium phosphate; (b) combining the premixture with water to form a secondary mixture, wherein the ratio of premixture to water is in the range of from about 1.6:1 to about 4:1; (c) mixing the secondary mixture for a period of time sufficient to obtain a substantially uniformly mixed dough and under conditions such that the temperature of the secondary mixture and uniformly mixed dough in the mixing operation are maintained in the range of from about 15° C. to about 45° C.; and (d) forming the uniformly mixed dough into a desired shaped piece. The forming operation is carried out in conjunction with low specific mechanical energy and high pressure conditions, and under conditions such that the temperature of the uniformly mixed dough in the forming operation is in the range of from about 40° C. to about 100° C. The present invention further relates to a piece prepared by the above-described process.

10 Claims, No Drawings

PROCESS FOR PREPARING RETORT-STABLE, SHAPED FOOD PIECES

FIELD OF INVENTION

The present invention relates to a process for preparing a retort-stable, shaped food piece which is cohesive and maintains its shape when retorted. The present invention further relates to the retort-stable, shaped food piece prepared by the process of the present invention.

BACKGROUND OF INVENTION

Pet owners typically have a great deal of affection for their pets. Many, in fact, consider their pets to be members of their families, and treat them accordingly by indulging them to a great degree. One of the ways owners indulge their pets is by the food they purchase for them. In this context, many owners derive pleasure from feeding their pets foods which contain shaped food pieces which the owner identifies with the particular type of pet. An example of this would be a bone-shaped food piece in a dog food.

Of course, these shaped food pieces must also contribute to satisfying the nutritional requirements for the particular pet. To accomplish this, the shaped pieces are preferably prepared from proteinaceous and farinaceous material. The term proteinaceous material refers to glutens such as wheat gluten. Proteinaceous material obtained from other sources such as defatted oil seed protein material; and other known proteinaceous sources (e.g., meat, fish, etc.) are not of use in the present invention. The term farinaceous material refers to cereal flours such as wheat flour.

One problem in preparing such shaped pieces is that many pet foods have to undergo the extreme processing conditions of a retort sterilization procedure. For certain shaped proteinaceous materials, such as meat analogs, this is not a concern. These meat analogs retain their analog properties even when subjected to a retort operation. However, these meat analogs are structurally different than the shaped pieces of the present invention in that they are typically prepared from texturized vegetable protein (TVP) and may have a striated texture. By "striated texture" it is meant that the shaped piece tends to have a texture analogous to muscle striations. This striated texture allows the shaped piece to be easily torn apart along the striations, and as such the piece does not have to maintain a distinct and definite shape when subjected to a retort operation.

The shaped pieces of the present invention do not have such a striated texture, however, but instead are, for the most part, cohesive. Until now, shaped pieces having a cohesive texture like those of the present invention could not withstand the extreme conditions of a retort operation, but would typically dissolve when retorted. This would be undesirable since the shaped piece would not maintain its original shape and form, but would be unrecognizable.

Thus, shaped food pieces having the cohesive consistency of the shaped pieces of the present invention are useful only when they are retort-stable, i.e., do not dissolve upon hydration and/or retorting, but maintain their desired shape. The present invention provides such a piece, as well as a process for its preparation.

BACKGROUND ART

There are numerous processes known in the art for producing shaped, extruded, edible proteinaceous products.

U.S. Pat. No. 3,968,268, issued Jul. 6, 1976 to Sair et al., discloses a process for producing hydratable, translucent to glassy, proteinaceous products, and the resulting products themselves. In the claimed process a water-moistened, edible proteinaceous material having at least about 40% by weight protein, on a dry weight basis, and an effective amount of water, within the range of about 10 to 50%, is subjected to working under effective mechanical pressure with added heat sufficient to convert it to a hot, moist, plastic extrudable mass. This hot, plastic mass is extruded through and from a length of a temperature controlled, elongated die under non-puffing conditions. The extruded product is unpuffed, substantially homogeneous, translucent to glassy, and characterized by having texture and retaining its structural integrity under retorting conditions. This product is alleged to be pleasing in the mouth and have protein cell bodies with the pleasing feel, firmness, structure, texture, coarseness, or bite characteristics found in uncooked or cooked food products.

Sair et al. also teach that in their process the proteinaceous material must be heated to a sufficiently high temperature to retain retort stability. Specifically, they teach that extruded proteinaceous materials which are extruded at temperatures of 180° F., 210° F., and 230° F., completely disintegrate when subjected to retorting. This is contrary to what has been found in the present invention, where the products are shaped and formed at low dough temperatures and maintain their shape when retorted.

U.S. Pat. No. 3,965,268, issued Jun. 22, 1976 to Stocker et al., refers to an expanded protein product comprising a sulfur-containing organic compound. Stocker et al. claim a method of preparing an expanded edible protein product having an open, cellular structure, the method comprising forming an admixture of proteinaceous material having a protein content of at least about 30% by weight, from about 0.05% to about 2.0% by weight of said proteinaceous material of a sulfur-containing organic compound selected from the group consisting of cysteine hydrochloride, D,L-methionine, sodium lignosulfonate, thiamine mononitrate, calcium thioglycollate, and mixtures thereof, and water in an amount sufficient to result in a moisture content of 15% to about 50% by weight of said admixture; heating the mix to a temperature above about 220° F.; mechanically working the heated mix at a pressure substantially above atmospheric pressure; and expanding the mix by suddenly releasing the pressure. The expanded product has a crisp, crunchy texture which lends itself to use in a large number of foodstuffs, for example snack items.

As can be seen, the product of the process taught by Stocker et al. has a different texture than the shaped edible piece of the present invention. Furthermore, the process taught by Stocker et al. includes a heating step which is not required in the process of the present invention.

As already stated herein, it is also known to make a striated, texturized shaped meat analog. This technology uses a vegetable protein, or extract, along with a sulfur-containing compound, typically a sulfur-containing amino acid or pure sulfur itself, to make the striated, texturized piece. An extrusion process operated under high shear and temperature conditions is typically used to manufacture this meat analog. The high shear and temperature conditions facilitate the cross-linking of the vegetable proteins.

The resulting extruded meat analog is typically very porous, and upon hydration expands to several times its dry weight and size. The hydrated meat analog is also porous and is spongy to the touch and chew. After retorting, the hydrated and retorted meat analog is spongy and soft. The meat analog is easily torn apart following retorting, due to its striated structure.

As can be seen, there is nothing in the art which teaches the shaped piece prepared by the process of the present invention. It is therefore an object of the present invention to provide a process for preparing such a shaped food piece which is cohesive and maintains a definite and distinct shape and integrity when hydrated and/or retorted.

It is another object of the present invention to provide an edible, shaped food piece which is cohesive and maintains a definite and distinct shape and integrity when hydrated and/or retorted.

These objects are accomplished by the invention described herein.

Unless otherwise specified, the weight percentages provided herein for the components of the premixture are on a wet basis.

SUMMARY OF THE INVENTION

The present invention relates to a process for preparing a cohesive, retort-stable, shaped food piece, said process comprising:

(a) preparing a premixture comprising
  (1) from about 20% to about 80% by weight gluten,
  (2) from about 20% to about 80% by weight flour,
  (3) from 0% to about 50% by weight meat and bone meal,
  (4) from 0% to about 9% by weight fat,
  (5) from 0% to about 0.7% by weight added sulfur,
  (6) from 0% to about 2% by weight dicalcium phosphate, wherein the weight percentage of the premixture components are expressed as a percentage of the premixture;

(b) combining the premixture with water to form a secondary mixture, wherein the ratio of premixture to water is in the range of from about 1.6:1 to about 4:1;

(c) mixing the secondary mixture for a period of time sufficient to obtain a substantially uniformly mixed dough and under conditions such that the temperature of the secondary mixture and uniformly mixed dough in the mixing operation are maintained in the range of from about 15° C. to about 45° C.; and (d) forming the uniformly mixed dough into a desired shaped piece, wherein the forming operation is carried out in conjunction with low specific mechanical energy and high pressure conditions, and under conditions such that the temperature of the uniformly mixed dough in the forming operation is in the range of from about 40° C. to about 100° C., and wherein said shaped piece is cohesive and maintains its shape when retorted.

The present invention further relates to a piece prepared by the above-described process.

DETAILED DESCRIPTION OF THE INVENTION

The present invention comprises a process for preparing a retort-stable, shaped food piece. The piece maintains its shape when hydrated and retorted, e.g., if the piece is originally formed in a bone shape, the hydrated piece will maintain the bone shape and the retorted piece will maintain the bone shape.

In the process of the present invention a premixture is initially prepared. The premixture comprises from about 20% to about 80%, preferably from 20% to about 40%, more preferably from about 25% to about 35% by weight gluten; from 0% to about 50%, preferably from about 1% to about 30%, more preferably from 2% to about 15% by weight meat and bone meal; from about 20% to about 80%, preferably from about 30% to about 75%, more preferably from about 35% to about 65% by weight flour; from 0% to about 9%, preferably from about 1% to about 8%, more preferably from about 3% to about 6% by weight fat; from 0% to about 0.7%, preferably from about 0.01% to about 0.5%, more preferably from about 0.1% to about 0.2% by weight added sulfur; and from 0% to about 2%, preferably from about 0.1% to about 1% by weight dicalcium phosphate.

The gluten of the present invention is preferably wheat gluten. It is believed that other glutens, such as corn gluten, may work in the present invention as well. These other glutens may also be combined with wheat gluten in the premixture.

Wheat gluten is a concentrated natural protein in the form of a light tan powder having a bland taste and aroma. Wheat gluten is known to consist mainly of gliadin (prolamine) and glutenin (glutelin), which are the principle cereal proteins, together with other components of the endosperm cell. Wheat gluten is separated from wheat flour by a washing method known to those skilled in the art.

The precise amount of gluten contained in the premixture of the present invention, while within the range of from about 20% to about 80% by weight, is dependent upon the particular type of gluten being utilized. The preferred wheat gluten comprises from about 20% to about 80%, preferably from about 20% to about 40%, more preferably from about 25% to about 35% by weight of the premixture. The gluten may be provided to the premixture in the form of isolated gluten added to the premixture, gluten inherent in the flour present in the premixture, and mixtures thereof.

The flour used in the present invention can be any type of flour obtained from known grains. Examples of flours useful in the present invention include, but are not limited to, wheat flour, corn flour, oat flour, and mixtures thereof, with wheat flour being preferred.

As with the gluten, the precise amount of flour used in preparing the premixture of the present invention, while within the range of from about 20% to about 80% by weight, is dependent upon the particular type of flour being utilized. For example, when wheat flour is used the premixture comprises from about 20% to about 80%, preferably from about 30% to about 70%, more preferably from about 50% to about 65% by weight wheat flour; when corn flour is used the premixture comprises from about 35% to about 70%, preferably from about 35% to about 60%, more preferably from about 35% to about 50% by weight corn flour.

Other types of cereal flours known to those skilled in the art can be used in the present invention. The precise amounts of these cereal flours useful herein will fall within the range of from about 20% to about 80% by weight, and can be determined by one skilled in the art.

The fat which may be added to the premixture of the present invention may be obtained from any fat source known to those skilled in the art. Examples of fat sources useful in the present invention include, but are not limited to, choice white grease, beef tallow, soy oil, corn oil, vegetable oil, and mixtures thereof, with choice white grease being the preferred fat source.

The amount of a particular fat source that must be used in the premixture is that amount necessary to provide a total fat content in the premixture in the range of from 0% to about 9%, preferably from about 1% to about 8%, more preferably from about 3% to about 6% by weight. Of course, the required amount of a particular fat source necessary to achieve this will vary for differing fat sources. However, this is something one skilled in the art can determine. When the preferred choice white grease is used as the fat source, the premixture comprises from 0% to about 9%, preferably from about 1% to about 8%, more preferably from about 3% to about 6% by weight choice white grease.

When fat is included in the premixture of the present invention it facilities the process of the present invention by lubricating the material flow through the forming operation, thereby lowering shear and energy transfer to the product.

The sulfur which may be added to the premixture of the present invention may be in the form of pure sulfur or either as an organic or inorganic sulfur-containing compound.

This sulfur is considered "added sulfur" and is added to the premixture separately from the other premixture ingredients and in a manner sufficient to contribute the specified amount of sulfur to the premixture. Sulfur may also be present in the other premixture ingredients (e.g., gluten, flour, etc.), but any such amounts are typically not significant and are not considered when determining the amount of sulfur added to the premixture.

Any type of sulfur-containing compound useful in the preparation of edible foodstuffs may be used in preparing the premixture of the present invention. Examples of useful sulfur-containing organic compounds include, but are not limited to, sulfur-containing amino acids, lower alkyl mercaptans, lower alkyl sulfides, lower alkyl disulfides, thioacids, and other compounds, for example thiamine, may be employed. Among these, compounds such as cysteine, cystine, methionine, thiodipropionic acid, thioglycollin, thiamine, lignosulfonic acid, and their salts are preferred, with methionine being most preferred.

The amount of a particular sulfur source that must be used in the premixture is that amount sufficient to provide a total added sulfur content in the premixture in the range of from 0% to about 0.7%, preferably from about 0.01% to about 0.5%, more preferably from about 0.1% to about 0.2% by weight of the premixture. Of course, the required amount of a particular sulfur source necessary to achieve this will vary for differing sulfur sources, although falling within the broad range specified above, and will be appreciated by one skilled in the art. When the preferred methionine is used as the sulfur source, it comprises from 0% to about 2%, preferably from about 0.1% to about 1%, more preferably from 0.2% to 0.5% by weight of the premixture.

The dicalcium phosphate, when added to the premixture of the present invention, comprises from 0% to about 2%, preferably from about 0.1% to about 1% by weight of the premixture.

The meat and bone meal, when added to the premixture of the present invention, is a source of protein and flavor. When used, the meat and bone comprises from 0% to about 50%, preferably from about 1% to about 30%, more preferably from about 2% to about 15% by weight of the premixture. There is no known preferred source of meat and bone meal, and as such the meat and bone meal can be obtained from any commercial source known to one skilled in the art.

Other optional ingredients which may be added to the premixture of the present invention include, but are not limited to, edible fiber sources, nutritional supplements, soy grits, coloring agents, and flavoring agents.

When such optional ingredients are added to the premixture, the levels at which they are added will vary depending upon the particular optional ingredient. When soy grits are included in the premixture they typically comprise from 0% to about 30%, preferably from 1% to about 15%, more preferably from about 2% to about 7% by weight of the premixture.

When adding the meat and bone meal, fat, sulfur, dicalcium phosphate, and other optional ingredients, care must be taken to avoid adding amounts of such ingredients which may disrupt the formation of a gluten matrix. If such disruption occurs, then retort stability may be adversely affected.

Coloring agents and flavoring agents are added to the premixture at levels necessary to impart the desired flavor and color to the final product, which will be dependent upon the preferences of the particular formulator. Such coloring and flavoring agents are typically added to the premixture at levels of less than 1% by weight.

The premixture is next combined with water to form a secondary mixture. The ratio of the premixture to water is in the range of about 1.6:1 to about 4:1, preferably from about 1.65:1 to about 2.5:1, more preferably from about 1.65:1 to about 1.85:1.

Any type of water may be used to form the secondary mixture of the present invention, i.e, deionized water, purified water, distilled water, tap water, etc. Of course, care should be taken to ensure that the water does not contain any impurities that may have an adverse effect on the final shaped piece produced in the present invention, i.e., particulate matter that might interrupt the gluten structure and adversely affect retort stability.

After the secondary mixture is prepared, it is mixed for a period of time sufficient to obtain a substantially uniformly mixed dough. Care must be taken to avoid mixing the secondary mixture past the point of minimum mobility or the dough (gluten structure) breaks down, and the resulting piece will not be retort stable. The minimum mobility of the secondary mixture can be determined by one skilled in the art.

The secondary mixture may be mixed by any method and/or apparatus known to those skilled in the art. Examples of mixing methods and/or apparatus useful in the present invention include, but are not limited to, a paddle mixer, a ribbon mixer, and a Hobart mixer (auger mixer), with a ribbon mixer being preferred.

The secondary mixture is mixed under conditions such that its temperature and the temperature of the resulting uniformly mixed dough are maintained in the range of from about 15° C. to about 45° C., preferably from about 20° C. to about 30° C., more preferably from about 20° C. to about 25° C.

The length of time necessary for mixing the secondary mixture to obtain the substantially uniformly mixed dough will depend upon the method of mixing used. When a ribbon mixer is used, the secondary mixture is typically mixed for a period of time in the range of from about 2 to about 10 minutes, preferably from about 3 to about 8 minutes, more preferably from about 4 to about 6 minutes.

After the substantially uniformly mixed dough is prepared, it is formed into the desired shaped piece. It is important that this forming operation or step take place in conjunction with low specific mechanical energy and under high pressure conditions. The low specific mechanical energy and high pressure conditions act in combination to provide the structural bonding necessary to have a retort-stable, final shaped piece.

The forming operation is carried out in conjunction with specific mechanical energy in the range of from about 6 watt.hr./kg. to about 70 watt.hr./kg., preferably from about 6 watt.hr./kg. to about 50 watt.hr./kg., more preferably from about 6 watt.hr./kg. to about 35 watt.hr./kg., and under a pressure of at least about 400 psig, preferably at least about 500 psig, more preferably at least about 600 psig. If the pressure under which the forming takes place is too low, a final cohesive shaped piece will not be produced, but instead discreet separate individual particles will result from the forming operation. Furthermore, even if the pressure is sufficient to provide a uniform, solid, discreet, shaped piece, it still must be high enough to allow for some expansion of the uniformly mixed dough after the forming pressure is released. By this it is meant that there must be sufficient pressure in the forming operation that when the pressure is released, the shaped dough product will have a slight expansion due to release of the pressure alone. The expansion is not due to any gas evolved after the pressure release or any other internal forces, other than the plastic reformation of the shaped product material.

It is also important that the forming operation take place under conditions such that the temperature of the uniformly mixed dough remains in the range of from about 40° C. to about 100° C., preferably from about 40° C. to about 90° C., more preferably from about 45° C. to about 90° C., still more preferably from about 60° C. to about 80° C. The specific mechanical energy and pressure will contribute to the increase in temperature of the substantially uniformly mixed dough as it is being formed into the desired shaped piece. However, care should be taken to minimize the temperature rise during the forming of the dough in order to minimize gelatinization of the dough and keep the dough temperatures within the ranges specified herein.

Although gelatinization of the starch is minimized, some gelatinization is necessary to form the desired shaped piece. However, if there is too much gelatinization the formed piece becomes highly hydrophilic and is not retort stable. The correct degree of gelatinization will provide a product which is neutral to hydrophobic. It is also possible that an overly gelatinized piece will form an expanded cell structure, which can cause the shaped piece to lack retort integrity as well.

The temperature of the substantially uniformly mixed dough is also kept low to avoid generating steam during the forming operation and causing the piece to have an expanded cell structure. If any steam is generated, then when the pressure is released during the forming operation it is possible that the steam will expand the shaped piece, causing the shaped piece to have an undesirable texture and lack retort integrity. All of these problems can be avoided by maintaining the temperature of the dough below its gelatinization point.

In a preferred embodiment of the present invention, the forming operation takes place in a low shear extruder. The low shear extruder in essence is an extruder which operates under low specific mechanical energy conditions and produces a product having a low dough temperature. Cooling of the low shear extruder maybe necessary to control the dough temperature if the specific mechanical energy causes the temperature to rise too high. However, this is unlikely under the low specific mechanical energy conditions under which the forming operation is carried out.

In this preferred embodiment, the low shear extruder is operated at a speed in a range of from about 40 to 60 RPM, preferably from about 45 to about 60 RPM, more preferably from about 50 to about 60 RPM; the temperature of the dough as it exits the low shear extruder is in the range of from about 40° C. to about 85° C., preferably from about 45° C. to about 65° C., more preferably from about 50° C. to about 60° C.; the pressure at the exit of the low shear extruder is at least about 400 psig, preferably at least about 500 psig, more preferably at least 600 psig; and the dough is extruded at a rate of 100 to 300 kg. dough per hr., preferably from about 100 to about 275 kg. dough per hr., more preferably from about 100 to about 250 kg. dough per hr.

In the present invention it has been found that a 4" diameter Bonnot 5-zone extruder is a preferred low shear extruder. While the reason for this preference is not exactly known, it is believed that the Bonnot extruder has a particularly desirable screw profile for use in the process of the present invention. This extruder is available from The Bonnot Company, located in Uniontown, Ohio.

Another way of forming the uniformly mixed dough into the desired shaped piece is to charge the uniformly mixed dough into a cylinder having a die head and a punch mechanism. When the cylinder is used, the punch mechanism is pressed into the dough-containing cylinder to cause the dough to be extruded through the die head, thereby forming the dough into an extruded rope having the desired cross-sectional shape. This extruded rope is then cut cross-sectionally along its length to obtain a discrete piece having the desired shape.

While not intending to be bound by theory, it is surprising and unexpected that the gluten and flour, and especially wheat gluten and wheat flour, when processed under the low specific mechanical energy, low dough temperature, and high pressure conditions of the process of the present invention produces a cohesive shaped piece which maintains its distinctive definitive shape upon hydration and retort. This is especially unexpected when it is considered that the product of the present invention is prepared using a low specific mechanical energy, low temperature, high pressure forming process. As already stated herein, the prior art teaches that high temperature extrusion (i.e., forming) is necessary to obtain a retort-stable piece. The art teaches that temperatures of at least about 250° F. are necessary for preparing a retort-stable product, and that retorted, proteinaceous extruded products which are extruded at temperatures of 180° F., 210° F., and 230° F. dissolve when retorted.

A preferred process of the present invention comprises:
(a) preparing a premixture comprising
  (1) from about 25% to about 35% by weight wheat gluten,
  (2) from about 50% to about 65% by weight wheat flour,
  (3) from 2% to about 15% by weight meat and bone meal,
  (4) from 3% to about 6% by weight choice white grease,
  (5) from 0.2% to about 0.5% by weight methionine,
  (6) from 0.1% to about 1% by weight dicalcium phosphate;
(b) combining the premixture with water to form a secondary mixture, wherein the ratio of premixture to water is in the range of from about 1.65:1 to about 1.85:1;
(c) mixing the secondary mixture in a ribbon mixer for a period of time in the range of from about 4 to about 6 minutes, thereby obtaining a substantially uniformly mixed dough, wherein said mixing is carried out under conditions such that the temperature of the secondary mixture and uniformly mixed dough in the mixing operation are maintained in the range of from about 20° C. to about 25° C.; and (d) forming the uniformly mixed dough into a desired shaped piece in a low shear extruder, wherein extruder is operated at a speed in the range of from about 50 to 60 RPM, the dough exit temperature is in the range of from about 50° C. to about 60° C., the exit pressure is at least 600 psig, and the specific mechanical energy provided by the extruder is in the range of from about 6 watt.hr./kg. to about 35 watt.hr./kg.

The present invention also relates to a cohesive, retort-stable, shaped food piece prepared by the method comprising:

(a) preparing a premixture comprising
  (1) from about 20% to about 80% by weight gluten,
  (2) from about 20% to about 80% by weight flour,
  (3) from 0% to about 50% by weight meat and bone meal,
  (4) from 0% to about 9% by weight fat,
  (5) from 0% to about 0.7% by weight added sulfur,
  (6) from 0% to about 2% by weight dicalcium phosphate, wherein the weight percentage of the premixture components are expressed as a percentage of the premixture;

(b) combining the premixture with water to form a secondary mixture, wherein the ratio of premixture to water is in the range of from about 1.6:1 to about 4:1;

(c) mixing the secondary mixture for a period of time sufficient to obtain a substantially uniformly mixed dough and under conditions such that the temperature of the secondary mixture and uniformly mixed dough in the mixing operation are maintained in the range of from about 15° C. to about 45° C.; and (d) forming the uniformly mixed dough into a desired shaped piece, wherein the forming operation is carried out in conjunction with low specific mechanical energy and high pressure conditions, and under conditions such that the temperature of the uniformly mixed dough in the forming operation is in the range of from about 40° C. to about 100° C., and wherein said shaped piece is cohesive and maintains its shape when retorted.

The present invention is further illustrated, but not limited by, the following examples.

EXAMPLES

Example 1

A premixture containing 25 lb. wheat gluten, 65 lb. wheat flour, 6 lb. choice white grease, 2 lb. of methionine, 2 lb. dicalcium phosphate, and 0.5 lb. of titanium dioxide is initially prepared and blended for 2 minutes in a Buffalo Mixer (which is a ribbon blender). Water is added to this blended premixture at a weight ratio of 2:1 (blended premixture:water) to prepare a wet mixture. The wet mixture is blended in the Buffalo Mixer for another 10 minutes to form a dough.

The dough is removed from the mixer fed to a 4 inch diameter, 5 zone Bonnot extruder using a "Bonnot #5" (designated by Bonnot) screw shaft. The exit of the extruder is fitted with a die having a single opening capable of making a product in the shape of a bone.

The extruder is operated at 60 RPM (screw rotation speed) and the body of the barrels is jacketed with cold water in the first two zones (numerating the zones starting from the feed inlet to the exit of the extruder) with nothing jacketing the last 3 zones. The dough is fed into the extruder at a rate as fast as the rotating screw can convey it away from the feed inlet (this is known as "choke-fed").

After operating for about 5 minutes the process reaches a state of equilibrium. The dough is being fed at about 200 kg./hr. The exit temperature of the product is 170° F. (62° C.) and the pressure, as measured at an outlet immediately before the die-assembly, is approximately 600 psig.

As the extrudate emerges from the die it is cut in pieces having a thickness of approximately ⅛ to ⅜ inch. The cut pieces are conveyed away from the pelletizer by a cool air stream which facilitates transfer and prevents the cut pieces from adhering to each other. The collected cut pieces are dried in a Proctor and Schwartz dryer for 2 hours until their overall moisture content is less than 12% w/w basis.

The dried cut pieces are placed in cans of pet food along with other components, such as meat pieces and gravy. The amount of cut pieces in each can is 3% and the gravy (which is essentially 95% water) comprises 50 wt. % of the can contents. The overall moisture content of the canned ingredients is approximately 80%. The cans are sealed and retorted at 250° F. for 65 minutes. The resulting retorted canned contents include the "bone-shaped" extruded pieces. The bone shape of the extruded pieces is essentially the same shape as the opening in the die. The "bone-piece" can be handled without losing its integrity.

Example 2

A dry mixture consisting of 283 lb. wheat gluten, 318 lb. meat and bone meal, 353 lb. wheat flour, 60 lb. choice white grease, 21 lb. methionine, 21 lb. dicalcium phosphate, and 4 lb. of titanium dioxide is blended for 2 minutes in a Buffalo Mixer (which is a ribbon blender). To 250 lb. of this mixture, 125 lb. of water is added. The "wet mixture" is then blended in the Buffalo Mixer for another 10 minutes.

The wet mixture ("the dough") is now removed from the mixer and ready to be fed to the extruder. The extruder used is a 4 inch diameter 5 zone Bonnot extruder using a "Bonnot #5" (designated by Bonnot) screw shaft. The exit of the extruder is fitted with a die consisting of a single rectangular opening (a "slit" shape) with the dimension of ⅛ inch width by ⅝" inch length.

The extruder is operating at 40 RPM (screw rotation speed) and the body of the barrels is jacketed with cold water in the first two zones (numerating the zones starting from the feed inlet to the exit of the extruder) and saturated steam at 15 psig jacketing the last 3 zones. The dough is fed into the extruder at a rate as fast as the rotating screw can convey it away from the feed inlet (this is also known as "choke-fed").

After operating for about 5 minutes at a rotating speed of 40 RPM and dough fed in continuously, the entire process has reached a state of equilibrium. The dough is being fed at about 300 kg./hr. The exit temperature of the product is 180° F. (68° C.) and the pressure, as measured at an outlet immediately before the die-assembly, is approximately 390 psig.

As the extrudate emerges from the die, it is pelletized by an attached multi-knife cutter. The cutting speed is set sufficiently fast to produce cut pieces of thickness of approximately ½ to 1 inch long, resulting in rectangular pieces. The kibble thus produced is then conveyed away from the pelletizer by a cool stream of air to facilitate transfer and to prevent the kibbles from adhering to each other. The collected kibbles are then dried in a Proctor and Schwartz dryer for 2 hours until the kibbles has reached an overall moisture of 8% w/w basis.

The dry kibble is now put into cans of pet foods along with other components, such as meat pieces and gravy. The amount of kibbles in each can is 3% and the gravy (which is essentially 95% water) is 50%; the overall moisture of the can content is 80%. The cans are sealed and retorted at 250° F. for 65 minutes. The resulting canned contents include "flat-shaped" extruded pieces. The cross sectional shape of the extruded pieces is essentially the same shape as the opening in the die. The "flatpiece" can be handled without losing its integrity.

Example 3

A dry mixture consisting of 190 lb. wheat gluten, 118 lb. wheat flour, 20 lb. choice white grease, 7 lb. dicalcium phosphate, 2 lb. of titanium dioxide, and 1 lb. of a aluminum lake color (yellow #6), is blended for 2 minutes in a Buffalo Mixer (which is a ribbon blender). To 250 lb. of this mixture, 125 lb. of water is added. The "wet mixture" is then blended in the Buffalo Mixer for another 10 minutes.

The wet mixture ("the dough") is now removed from the mixer and ready to be fed to the extruder. The extruder used is a 4 inch diameter 5 zone Bonnot extruder using a "Bonnot #5" (designated by Bonnot) screw shaft. The exit of the extruder is fitted with a die consisting of 9 circular openings and each opening has a diameter of ⅛ inch.

The extruder is operating at 57 RPM (screw rotation speed) and the body of the barrels is jacketed with cold water jacketing all 5 zones. The dough is fed into the extruder at a rate as fast as the rotating screw can convey it away from the feed inlet (this is also known as "choke-fed").

After operating for about 5 minutes at a rotating speed of 57 RPM and dough fed in continuously, the entire process has reached a state of equilibrium. The dough is being fed at about 250 kg./hr. The exit temperature of the product is 155° F. (54° C.) and the pressure, as measured at an outlet immediately before the die-assembly, is approximately 800 psig.

As the extrudate emerges from the die, it is pelletized by an attached multi-knife cutter. The cutting speed is set sufficiently fast to produce cut pieces of thickness of approximately 1 to 1½ inch long. The "strand" kibble thus produced is then conveyed away from the pelletizer by a cool stream of air to facilitate transfer and to prevent the kibbles from adhering to each other. The collected kibbles are then dried in a Proctor and Schwartz dryer for 2 hours until the kibbles has reached an overall moisture of 10% w/w basis.

The dry kibble is now put into cans of pet foods along with other components, such as meat pieces and gravy. The amount of kibbles in each can is 3% and the gravy (which is essentially 95% water) is 50%; the overall moisture of the can content is 80%. The cans are sealed and retorted at 250° F. for 65 minutes. The resulting canned contents include "strand-shaped" extruded pieces. The shape of the extruded pieces is essentially circular in diameter and slightly longer than the original extruded piece. The "strand-piece" can be handled without losing its integrity.

Example 4

A premixture containing 97 lb. wheat gluten meal, 128.25 lb. wheat feed flour, 4.75 lb. methionine, and 4.75 lb. dicalcium phosphate is initially hand dumped and blended in a ribbon mixer for 3 minutes. To the initial mixture, 14.25 lb. choice white grease is added and blended for 5 minutes to form the blended premixture. Water is added to the blended premixture at a weight ratio of 2.37:1 (blended premixture:water) to prepare a wet mixture. The wet mixture is blended in the ribbon mixer for an additional 5 minutes to develop a uniform dough.

The dough is manually removed from the mixer and manually fed to a 4" diameter, 5-zone Bonnot extruder using a Bonnot #5 screw (the extruder is fitted with a 15 HP motor). The exit of the extruder is fitted with a die insert with a single opening capable of making a definitively shaped product (e.g., bone, fish, wedge). For optimum conditions, the extruder is operated empty for at least 10 minutes prior to the introduction of the wet dough. This operating time serves as a warm-up and facilitates achieving steady-state conditions within five minutes of manufacturing.

The extruder is operated at 59 RPM (screw rotation speed) and the body of the barrel is jacketed with cold water in the first two zones (the numbering starts with the feed inlet and ends at the exit of the extruder). The third and fifth zones of the extruder are left at ambient conditions and the fourth zone is steam jacketed. The dough is choke-fed into the extruder. By "choke-fed" it is meant that there is more material in the extruder hopper than the screw can convey through the barrel instantly.

Within five minutes the process achieves steady state conditions. The dough is fed at about 225 kg./hr and exits the extruder at a temperature between 65°–70° C. under a pressure between 400–600 psig. Both the temperature and pressure are measured immediately before the extruder outlet.

As the extrudate exits the die assembly, it is face-cut to form pieces having a thickness of approximately ⅛ to ⅜ inch. The cut pieces are conveyed via an air-cooled conveyor with a wire mesh belt. The cool air reduces stickiness due to evaporative flashing. The air-cooled pieces are collected in wire mesh trays and dried in a Proctor & Schwartz batch oven for 2.5 hours at 93° C. or until the moisture content is less than 10% on a wet basis. The product is dried for stability during storage but can be used in a canned product without the preliminary drying.

The dried, shaped pieces are included as a component in canned dog food with other dog food components, including meat and gravy. The shaped, extruded piece is included as 3% of the final can weight, including gravy. The ratio of gravy to component is generally about 48:52 (gravy:components). The canned components and gravy are sealed and retorted for 65 minutes at 120° C. The final product includes the retort-stable shaped pieces in a chunk and gravy matrix. The shaped pieces, upon hydration, weigh about 3 times their original weight and have increased in size by at least 25%. By "retort stable" it is meant that the shaped piece can be easily handled without changing shape, breaking apart, or losing the identity of the original shape.

What is claimed is:

1. A process for preparing a cohesive, retort-stable, shaped food piece, which process comprises:
    (a) preparing a premixture comprising
        (1) from about 20% to about 80% by weight gluten,
        (2) from about 20% to about 80% by weight flour,
        (3) from 0% to about 50% by weight meat and bone meal,
        (4) from 0% to about 9% by weight fat,
        (5) from 0% to about 0.7% by weight added sulfur,
        (6) from 0% to about 2% by weight dicalcium phosphate, wherein the weight percentage of the premixture components are expressed as a percentage of the premixture;

(b) combining the premixture with water to form a secondary mixture, wherein the ratio of premixture to water is in the range of from about 1.6:1 to about 4:1;

(c) mixing the secondary mixture for a period of time sufficient to obtain a substantially uniformly mixed dough and under conditions such that the temperature of the secondary mixture and uniformly mixed dough in the mixing operation are maintained in the range of from about 15° C. to about 45° C.; and (d) forming the uniformly mixed dough into a desired shaped piece, wherein the forming operation is carried out at a specific mechanical energy in the range of from about 6 watt.hr./kg. to about 70 watt. hr./kg. and at a pressure of at least about 400 psig, and under conditions such that the temperature of the uniformly mixed dough in the forming operation is in the range of from about 40° C. to about 100° C., and wherein said shaped piece is cohesive and maintains its shape when retorted.

2. A process according to claim 1 wherein the gluten is in the form of wheat gluten, the flour is in the form of wheat flour, the fat is in the form of choice white grease, the sulfur is in the form of methionine, and wherein the premixture comprises from about 20% to about 40% by weight wheat gluten, from about 30% to about 70% by weight wheat flour, from about 1% to about 30% by weight meat and bone meal, from about 1% to about 8% by weight choice white grease, from about 0.1% to about 1% by weight methionine, and from about 0.1% to about 1% by weight dicalcium phosphate.

3. A process according to claim 2 wherein the ratio of premixture to water is in the range of from about 1.65:1 to about 2.5:1.

4. A process according to claim 3 wherein the secondary mixture is mixed in a paddle mixer for a period of time in the range of from about 3 minutes to about 8 minutes.

5. A process according to claim 4 wherein the uniformly mixed dough is formed into the desired shaped piece in a low shear extruder.

6. A process according to claim 5 wherein the extruder is operated at a pressure of at least about 500 psig.

7. A process according to claim 6 wherein the specific mechanical energy of the extruder is in the range of from about 6 watt.hr./kg. to about 50 watt.hr./kg., wherein the extruder is operated at a speed in the range of from about 45 to about 60 RPM, and wherein the temperature of the dough exiting the forming extruder is in the range of from about 45° C. to about 90° C.

8. A process for preparing a cohesive, retort-stable, shaped food piece, which process comprises:

(a) preparing a premixture comprising
(1) from about 25% to about 35% by weight wheat gluten,
(2) from about 50% to about 65% by weight wheat flour,
(3) from about 2% to about 15% by weight meat and bone meal,
(4) from about 3% to about 6% by weight choice white grease,
(5) from about 0.2% to about 0.5% by weight methionine,
(6) from about 0.1% to about 1% by weight dicalcium phosphate;

(b) combining the premixture with water to form a secondary mixture, wherein the ratio of premixture to water is in the range of from about 1.65:1 to about 1.85:1;

(c) mixing the secondary mixture in a ribbon mixer for a period of time in the range of from about 4 to about 6 minutes, thereby obtaining a substantially uniformly mixed dough, wherein said mixing is carried out under conditions such that the temperature of the secondary mixture and uniformly mixed dough in the mixing operation are maintained in the range of from about 20° C. to about 25° C.; and (d) forming the uniformly mixed dough into a desired shaped piece in a low shear extruder, wherein the extruder is operated at a speed in the range of from about 50 to 60 RPM, the dough exit temperature is in the range of from about 50° C. to about 60° C., the exit pressure is at least 600 psig, and the specific mechanical energy provided by the extruder is in the range of from about 6 watt.hr./kg. to about 35 watt.hr./kg.

9. A cohesive, retort-stable, shaped food piece prepared by the process comprising:

(a) preparing a premixture comprising
(1) from about 20% to about 80% by weight gluten,
(2) from about 20% to about 80% by weight flour,
(3) from 0% to about 50% by weight meat and bone meal,
(4) from 0% to about 9% by weight fat,
(5) from 0% to about 0.7% by weight added sulfur,
(6) from 0% to about 2% by weight dicalcium phosphate, wherein the weight percentage of the premixture components are expressed as a percentage of the premixture;

(b) combining the premixture with water to form a secondary mixture, wherein the ratio of premixture to water is in the range of from about 1.6:1 to about 4:1;

(c) mixing the secondary mixture for a period of time sufficient to obtain a substantially uniformly mixed dough and under conditions such that the temperature of the secondary mixture and uniformly mixed dough in the mixing operation are maintained in the range of from about 15° C. to about 45° C.;

(d) forming the uniformly mixed dough into a desired shaped piece, wherein the forming operation is carried out at a specific mechanical energy in the range of from about 6 watt.hr./kg. to about 70 watt.hr./kg. and at a pressure of at least about 400 psig., and under conditions such that the temperature of the uniformly mixed dough in the forming operation is in the range of from about 40° C. to about 100° C., and wherein said shaped piece is cohesive and maintains its shape when retorted.

10. A cohesive, retort-stable, shaped food piece prepared by the method comprising:

(a) preparing a premixture comprising
(1) from about 25% to about 35% by weight wheat gluten,
(2) from about 50% to about 65% by weight wheat flour,
(3) from about 2% to about 15% by weight meat and bone meal,
(4) from about 3% to about 6% by weight choice white grease,
(5) from about 0.2% to about 0.5% by weight methionine,
(6) from about 0.1% to about 1% by weight dicalcium phosphate;

(b) combining the premixture with water to form a secondary mixture, wherein the ratio of premixture to water is in the range of from about 1.65:1 to about 1.85:1;

(c) mixing the secondary mixture in a ribbon mixer for a period of time in the range of from about 4 to about 6 minutes, thereby obtaining a substantially uniformly mixed dough, wherein said mixing is carried out under conditions such that the temperature of the secondary mixture and uniformly mixed dough in the mixing operation are maintained in the range of from about 20° C. to about 25° C.; and (d) forming the uniformly mixed dough into a desired shaped piece in a low shear extruder, wherein the extruder is operated at a speed in the range of from about 50 to 60 RPM, the dough exit temperature is in the range of from about 50° C. to about 60° C., the exit pressure is at least 600 psig, and the specific mechanical energy provided by the extruder is in the range of from about 6 watt.hr./kg. to about 35 watt.hr./kg.

* * * * *